(12) United States Patent
Hayashi et al.

(10) Patent No.: US 9,353,502 B2
(45) Date of Patent: May 31, 2016

(54) WHEEL LOADER (71) Applicant: KOMATSU LTD., Tokyo (JP)

(72) Inventors: Daisuke Hayashi, Komatsu (JP); Nobuo Matsuyama, Komatsu (JP)

(73) Assignee: KOMATSU LTD., Tokyo (JP)

( * ) Notice: Subject to any disclaimer, the term of this patent is extended or adjusted under 35 U.S.C. 154(b) by 395 days.

(21) Appl. No.: 14/001,353

(22) PCT Filed: Dec. 12, 2012

(86) PCT No.: PCT/JP2012/082114
§ 371 (c)(1),
(2) Date: Aug. 23, 2013

(87) PCT Pub. No.: WO2014/064852
PCT Pub. Date: May 1, 2014

(65) Prior Publication Data
US 2015/0299981 A1 Oct. 22, 2015

(30) Foreign Application Priority Data

Oct. 26, 2012 (JP) .................................. 2012-237063

(51) Int. Cl.
B60K 11/00 (2006.01)
E02F 9/08 (2006.01)
B60K 13/02 (2006.01)
(Continued)

(52) U.S. Cl.
CPC . *E02F 9/08* (2013.01); *B60K 13/02* (2013.01); *E02F 9/0833* (2013.01); *E02F 9/0866* (2013.01); *E02F 9/0883* (2013.01); *E02F 9/16* (2013.01); *F02M 35/164* (2013.01)

(58) Field of Classification Search
CPC ............. E02F 9/08; E02F 9/16; E02F 9/0883; E02F 9/0833; E02F 9/0866; B60K 13/02; F02M 35/164; F02M 35/00; F02M 35/02; F02M 35/024; F02M 35/02416
USPC ...................... 180/296, 301; 60/272, 299, 311
See application file for complete search history.

(56) References Cited

U.S. PATENT DOCUMENTS 3,720,279 A * 3/1973 Vincenty ....................... 180/68.3
4,917,202 A * 4/1990 Glover et al. ................. 180/68.3
(Continued)

FOREIGN PATENT DOCUMENTS

EP 1 832 731 A1 9/2007
JP 2003-11679 A 1/2003
(Continued)

OTHER PUBLICATIONS

International Search Report for PCT/JP2012/082114, issued on Mar. 26, 2013.
(Continued)

Primary Examiner — James M Dolak
(74) Attorney, Agent, or Firm — Global IP Counselors, LLP (57) ABSTRACT A wheel loader includes a cab, steps provided beside the cab, an engine disposed to the rear of the cab, a vehicle body cover covering the engine, and an air cleaner. The air cleaner has a filter exchangeable by being pulled out horizontally. The air cleaner is connected to the engine via an intake pipe. The air cleaner is disposed to an outside of the vehicle body cover and to the rear of the cab, and is disposed in a slanted manner so that a side from which the filter is pulled out is further away from the cab than an opposite side.

13 Claims, 12 Drawing Sheets (51) Int. Cl.
  *E02F 9/16* (2006.01)
  *F02M 35/16* (2006.01)

(56) References Cited

U.S. PATENT DOCUMENTS

| | | | |
|---|---|---|---|
| 6,874,589 B1* | 4/2005 | Williams | 180/68.3 |
| 7,717,205 B2* | 5/2010 | Kertz et al. | 180/68.3 |
| 7,836,967 B2* | 11/2010 | Daniel et al. | 172/781 |
| 8,499,870 B2* | 8/2013 | Nakamura et al. | 180/68.3 |
| 8,505,661 B2* | 8/2013 | Tsuji et al. | 180/68.4 |
| 8,851,224 B2* | 10/2014 | Hayashi et al. | 180/309 |
| 8,936,128 B2* | 1/2015 | Numa | 180/69.25 |
| 8,945,259 B2* | 2/2015 | Watanabe et al. | 55/385.3 |
| 8,997,915 B2* | 4/2015 | Hayashi et al. | 180/309 |
| 9,056,547 B2* | 6/2015 | Kimijima et al. | |
| 9,212,466 B2* | 12/2015 | Yokota | E02F 9/0858 |
| 9,267,267 B1* | 2/2016 | Kamimae | B60K 13/02 |
| 2008/0202451 A1* | 8/2008 | Taniuchi et al. | 123/41.15 |
| 2010/0018732 A1 | 1/2010 | Daniel et al. | |

FOREIGN PATENT DOCUMENTS

| | | |
|---|---|---|
| JP | 2003-335268 A | 11/2003 |
| JP | 2012-184602 A | 9/2012 |

OTHER PUBLICATIONS

The extended European search report for the corresponding European application No. 12867723.4, issued on Mar. 27, 2014.

* cited by examiner

WHEEL LOADER

CROSS-REFERENCE TO RELATED APPLICATIONS

This application is a U.S. National stage application of International Application No. PCT/JP2012/082114, filed on Dec. 12, 2012. This U.S. National stage application claims priority under 35 U.S.C. §119(a) to Japanese Patent Application No. 2012-237063, filed in Japan on Oct. 26, 2012, the entire contents of which are hereby incorporated herein by reference.

FIELD OF THE INVENTION

The present invention relates to a wheel loader and in particular to a wheel loader equipped with an air cleaner.

BACKGROUND

Description of the Related Art

An exhaust gas post-processing device is mounted on a wheel loader. The exhaust gas post-processing device includes a diesel particulate filtering device that collects and removes particulate matter of soot and the like included in the diesel engine exhaust gas. The diesel particulate filtering device is mounted in a row with an air cleaner on an upper portion of the engine. A nitrogen oxide reduction catalyst device may also be provided to remove NOx from the exhaust gas. The nitrogen oxide reduction catalyst device is provided on the exhaust downstream side of the diesel particulate filtering device.

As described above, while the diesel particulate filtering device is disposed with the air cleaner on an upper portion of the engine, the installation location of the nitrogen oxide reduction catalyst device becomes a problem if the nitrogen oxide reduction catalyst device is installed in addition to the diesel particulate filtering device. Since the nitrogen oxide reduction catalyst device needs to be disposed on the exhaust downstream side of the diesel particulate filtering device, generally the nitrogen oxide reduction catalyst device is mounted in a row with the air cleaner and the diesel particulate filtering device on the upper portion of the engine when the nitrogen oxide reduction catalyst device is installed in addition to the diesel particulate filtering device.

However, a problem arises with the spatial relationship when the air cleaner, the diesel particulate filtering device, and the nitrogen oxide reduction catalyst device are all disposed in a row above the engine. Therefore, while disposing a relatively light air cleaner above the diesel particulate filtering device and the nitrogen oxide reduction catalyst device may be considered, the top plate of the engine room becomes higher in this case and visibility to the rear is reduced.

Accordingly, a configuration has been proposed for a large-scale dump truck described in Japanese Laid-open Patent No. 2003-335268 in which an engine room is provided beside the cab and an air cleaner is disposed on the outside of the engine room. With such a configuration, visibility to the rear is not reduced when the air cleaner is disposed on the upper portion of the engine room.

SUMMARY

However, since the engine room is disposed to the rear of the cab in a wheel loader, visibility to the rear may become reduced if the configuration described in Japanese Laid-open Patent No. 2003-335268 is applied as-is to the wheel loader. Further, the air cleaner needs to be disposed to allow for ease of maintenance work since the filter inside the air cleaner requires regular cleaning and exchanging at certain time periods.

An object of the present invention is to dispose the air cleaner on the wheel loader in such a way as to prevent a reduction in visibility to the rear and to enable ease of maintenance work.

A wheel loader according to a first aspect of the present invention has a cab with a driver's seat provided therein, steps provided beside the cab for ascending to and descending from the cab, an engine disposed to the rear of the cab, and an air cleaner. The air cleaner includes a filter that can be exchanged by being pulled out horizontally, and is connected to the engine via an intake pipe. The air cleaner is disposed beside the rear of the cab and on the outside of a vehicle body cover, and is slanted so that a side from which the filter can be pulled out is further away from the cab than an opposite side.

The air cleaner in the wheel loader is provided on the outside of the vehicle body cover and to the rear of the cab, and is not provided on the engine room. The air cleaner is disposed so as to be slanted so that the side from which the filter is pulled out is further away from the cab than the opposite side.

In this case, since the air cleaner is disposed outside of the engine room, the top plate of the engine room does not need to be made higher even if the exhaust gas post-processing device is installed above the engine inside the engine room. Therefore, a reduction in visibility to the rear can be avoided even with the installation of the exhaust gas post-processing device. Further, an operator is able to perform maintenance of the air cleaner while standing on the steps and thus maintenance work becomes easier. Furthermore, since the air cleaner is disposed in a slanted manner so that the side from which the filter is pulled out is further away from the cab than the opposite side, the filter can be removed easily when exchanging the filter.

A wheel loader according to a second aspect of the present invention is related to the wheel loader of the first aspect, wherein the air cleaner is disposed to the rear of the steps.

In this case, since the air cleaner is disposed to the rear of the steps, work can be performed more easily when the operator stands on the steps to perform the maintenance of the air cleaner.

A wheel loader according to a third aspect of the present invention is related to the wheel loader of the first or second aspects, wherein the cab has a cab body and a door supported by a rear portion of the cab body so that the front side of the door is openable and closable. The air cleaner is disposed at a location that does not obstruct the door when the door is fully open.

The door is not obstructed by the air cleaner when the operator opens or closes the door to enter or exit the cab.

A wheel loader according to a fourth aspect of the present invention is related to the wheel loader of any of the first to third aspects, and further comprises an operating fluid tank disposed between the cab and the engine, wherein the air cleaner is disposed beside the operating fluid tank.

Similar to the wheel loader of the first aspect, a reduction in visibility to the rear can be avoided even if the exhaust gas post-processing device is installed, and the maintenance work of the air cleaner can be performed more easily.

A wheel loader according to a fifth aspect of the present invention is related to the wheel loader of any of the first to fourth aspects, and further comprises a rear wheel fender disposed above a rear wheel, wherein the air cleaner is fixed to an upper portion of the rear wheel fender.

Similar to the wheel loader of the first and fourth aspects, a reduction in visibility to the rear can be avoided even if the exhaust gas post-processing device is installed, and the maintenance work of the air cleaner can be performed more easily.

A wheel loader according to a sixth aspect of the present invention is related to the wheel loader of any of the first to fifth aspects, and further includes an exhaust gas post-processing device that is disposed above the engine and includes a diesel particulate filtering device and a nitrogen oxide reduction catalyst device that are disposed in a row in the front-back direction.

Since the air cleaner is disposed toward the rear portion of the cab, the diesel particulate filtering device and the nitrogen oxide reduction catalyst device can be installed above the engine without hampering visibility to the rear.

A wheel loader according to a seventh aspect of the present invention is related to the wheel loader of the sixth aspect, and further comprises a vehicle body frame that supports the engine, and a supporting mechanism that is fixed to the vehicle body frame and upon which is mounted the exhaust gas post-processing device.

The exhaust gas post-processing device that includes the diesel particulate filtering device and the nitrogen oxide reduction catalyst device is heavy. As a result, when the above devices are supported directly by the engine, the center of mass of the structure including the engine increases and the engine vibration becomes very large.

Accordingly, the supporting mechanism fixed to the vehicle body frame is provided in the wheel loader of the seventh aspect and the exhaust gas post-processing device is mounted on the supporting mechanism. As a result, engine vibration can be suppressed.

A wheel loader according to an eighth aspect of the present invention further comprises an air cleaner cover covering portions except for a pull-out opening for the filter and an air intake mouth.

The air cleaner can be protected by the air cleaner cover.

A reduction in visibility to the rear is prevented and maintenance work on the air cleaner can be performed more easily in the wheel loader of the present invention as described above since the air cleaner is disposed toward the rear portion of the cab and is disposed in a slanted manner so that the front from where the filter is pulled out is further away from the cab.

DESCRIPTION OF EMBODIMENTS

Figure 1:
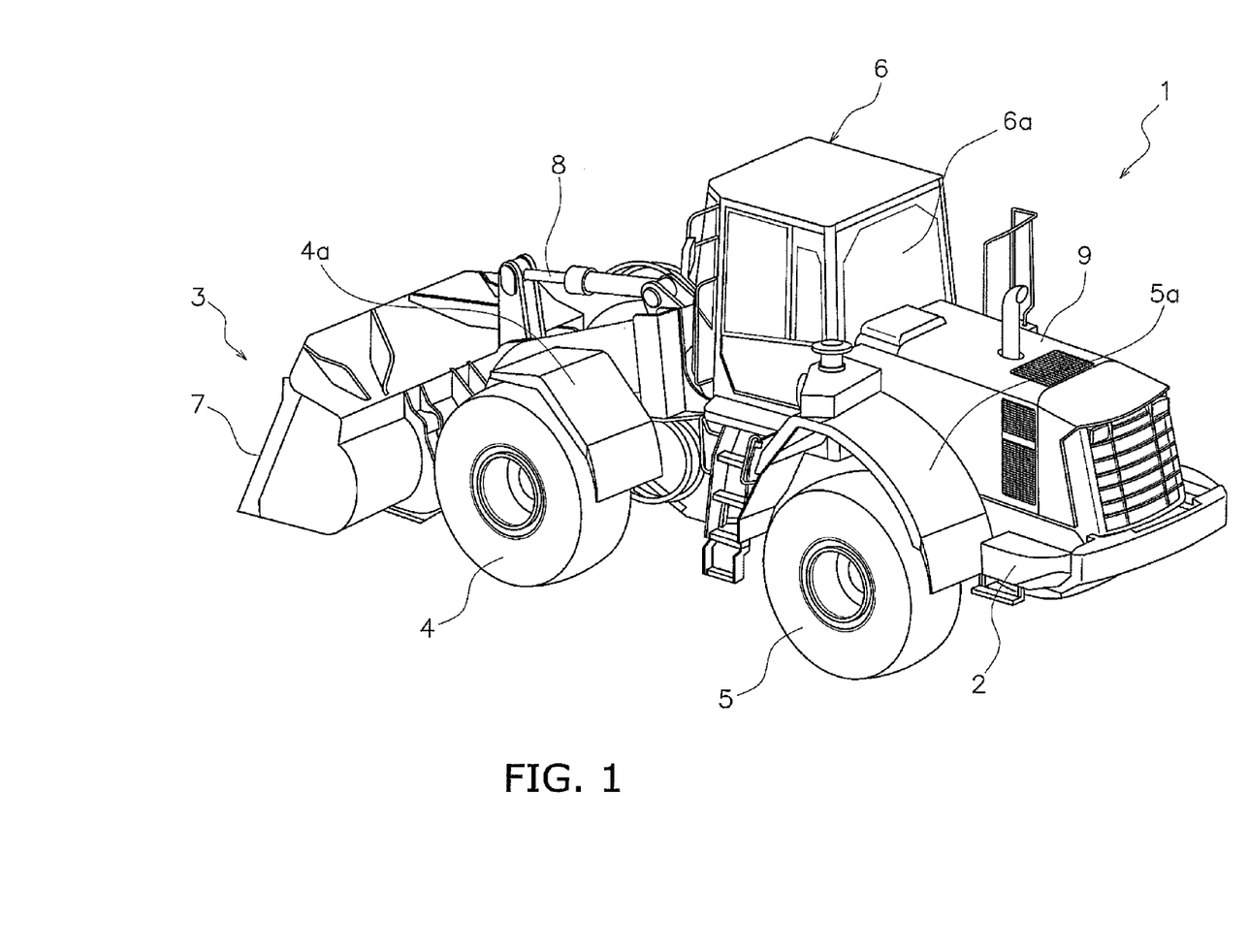
FIG. 1 is an external perspective view of a wheel loader according to a first embodiment of the present invention.
Figure 2:
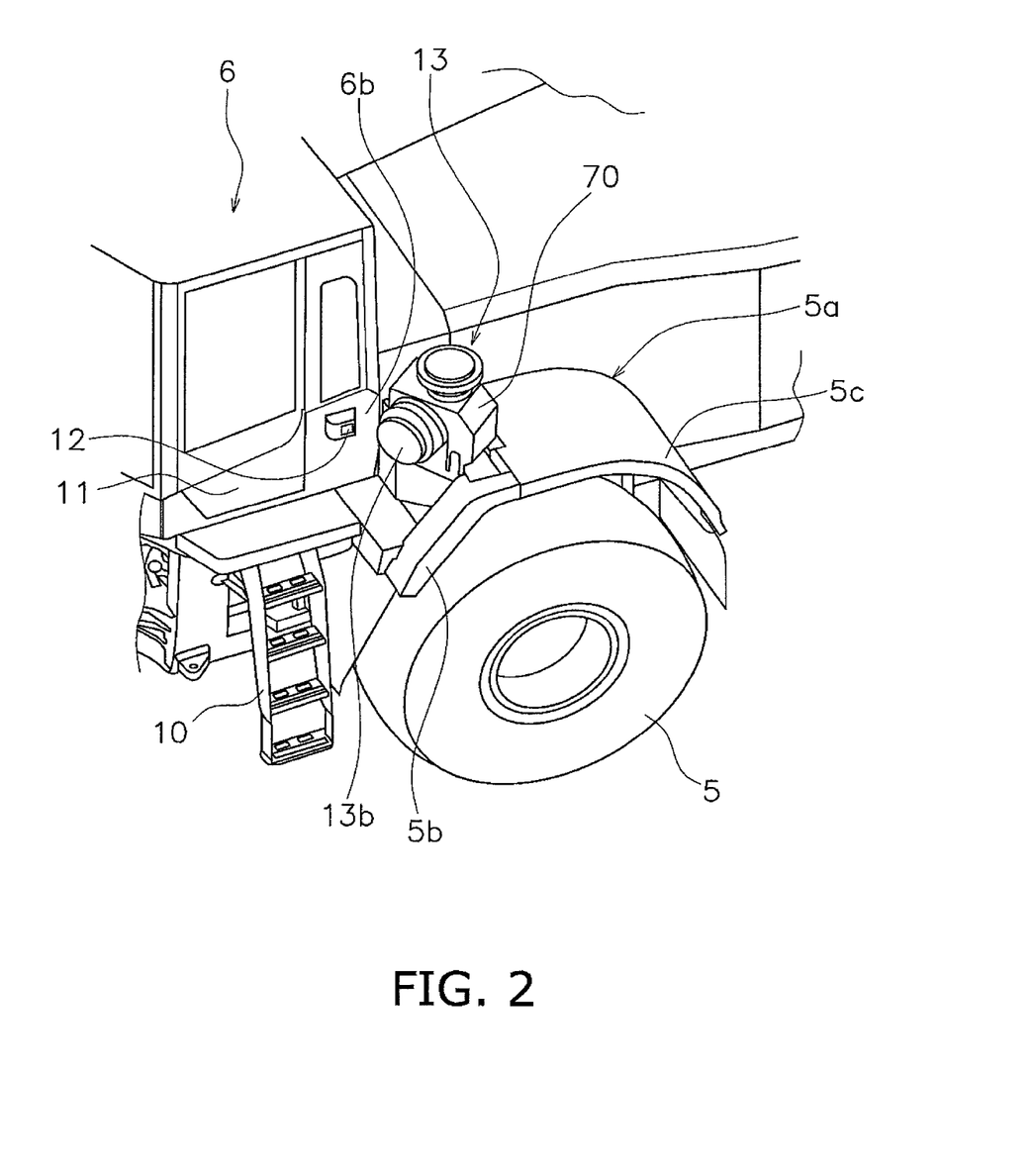
FIG. 2 is an external perspective partial view from the left front of the wheel loader of FIG. 1.

FIG. 1 illustrates an external perspective view of a wheel loader 1 according to an embodiment of the present invention. FIG. 2 illustrates a portion of the wheel loader on the left side of the cab.

In the following explanation, "front" refers to the front of the vehicle and "rear" refers to the rear of the vehicle. "Left" and "right" refer respectively to the left and right of the vehicle looking toward the front of the vehicle.

(Overall Configuration)

The wheel loader 1 includes a vehicle body frame 2, working equipment 3, front wheels 4, rear wheels 5, and a cab 6. The wheel loader 1 is capable of traveling due to the rotation of the front wheels 4 and the rear wheels 5, and desired work can be conducted using the working equipment 3.

The vehicle body frame 2 includes a front body portion and a rear body portion which are connected to each other to allow for pivoting in the crosswise direction. The working equipment 3 and the front wheels 4 are provided on the front body portion. The rear wheels 5 and the cab 6 are provided on the rear body portion. The working equipment 3 is disposed at the front of the front body portion and includes a bucket 7, a bucket cylinder 8 and the like. Fenders 4a, 5a are respectively provided above and to the rear of the front wheels 4 and the rear wheels 5. An operating cabin 6a and various operating members and an operating panel are provided inside the cab 6.

As illustrated in FIG. 2, steps 10 for ascending to and descending from the cab 6 are provided on the left side of the cab 6. The steps 10 are disposed in front of the rear wheel fender 5a. A door 11 is provided in the cab 6 with the rear thereof supported by a hinge on the cab body 6b and the front thereof being openable and closable. The maximum degree of opening of the door 11 is limited by a stopper 12 provided on the outside of the cab body 6b. An air cleaner 13 is disposed on an upper portion of the rear wheel fender 5a on the left side. A detailed explanation of the air cleaner 13 is provided below. Foreign matter in the air drawn into the engine 15 is removed and the air is purified by the air cleaner 13.

Figure 3:
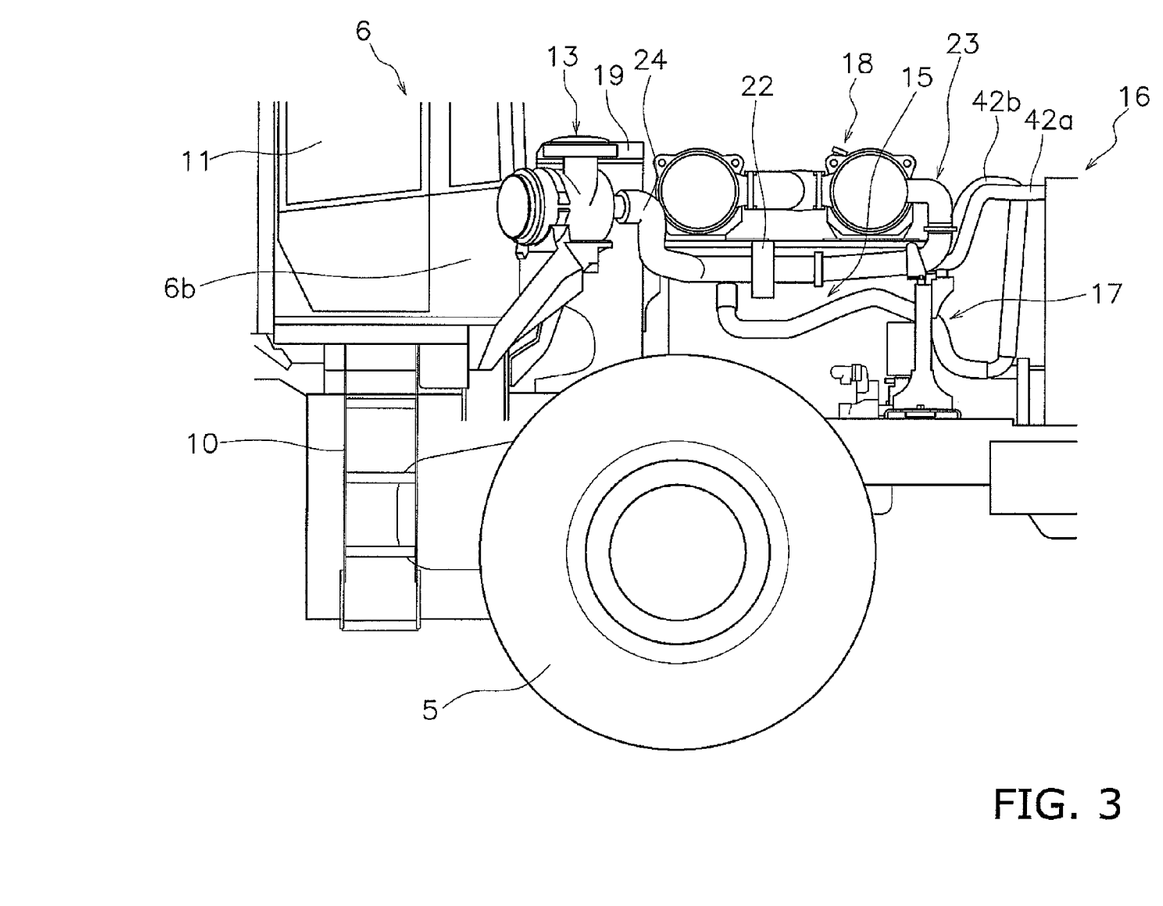
FIG. 3 is a side partial view with the vehicle body cover of the wheel loader of FIG. 1 removed.

FIG. 3 is a view of the rear body portion as seen from the left side of the vehicle with a vehicle body cover 9 (FIG. 1) to the rear of the cab 6 removed. As illustrated in FIG. 3, the engine 15, a cooling unit 16 disposed to the rear of the engine 15, a supporting mechanism 17, and an exhaust gas post-processing device 18 mounted on the supporting mechanism 17 above the engine 15 are disposed in the rear portion of the rear body portion. An operating fluid tank 19 is disposed between the cab 6 and the engine 15.

Figure 4:
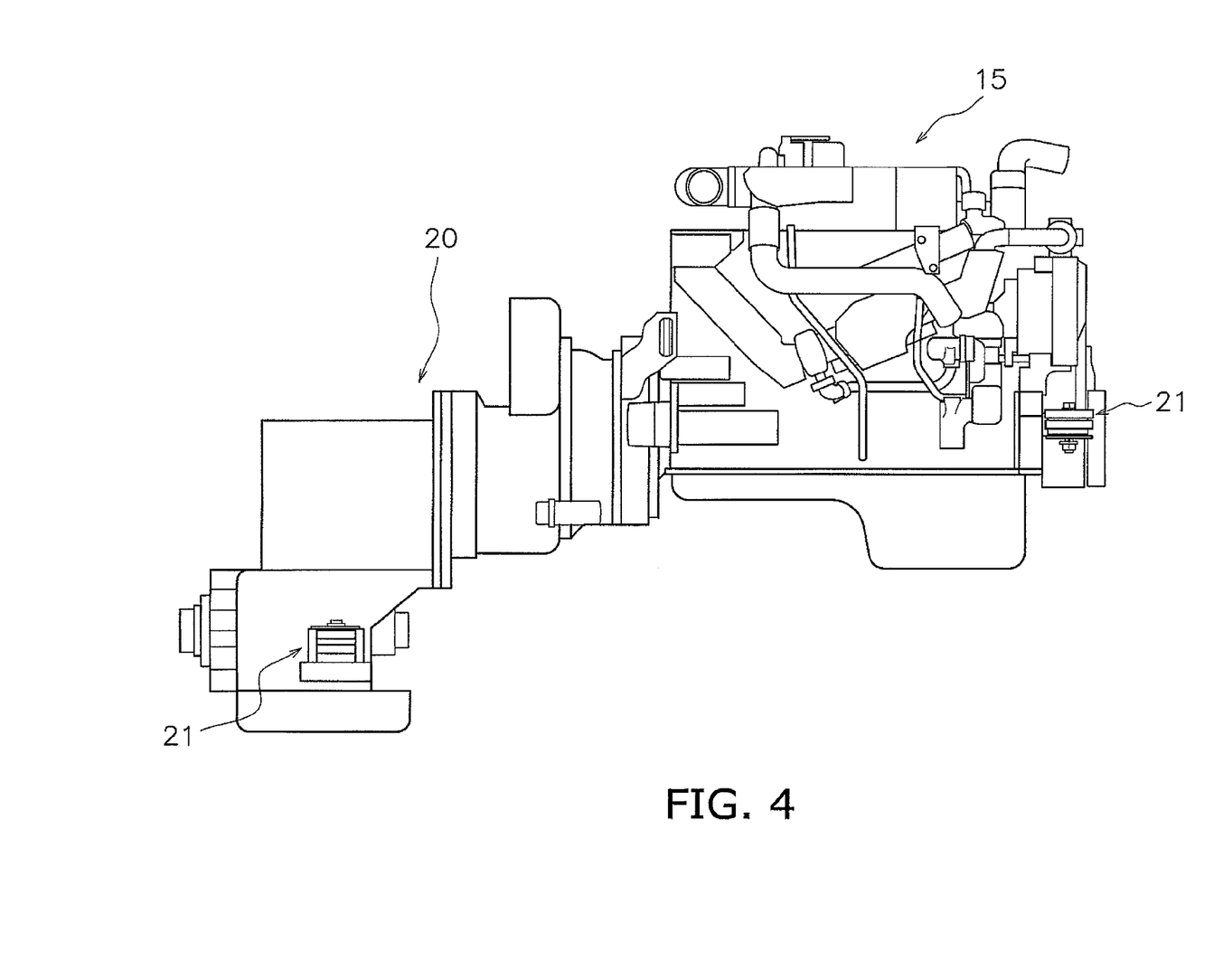
FIG. 4 illustrates a mounted state of an engine and a transmission.

The engine 15 is a so-called vertical mounted engine and is disposed so that a crankshaft extends in the front-back direction. The engine 15 is fixed to a transmission 20 with bolts to form an integrated structure as illustrated in FIG. 4. The engine 15 and the transmission 20 are supported in four locations on the vehicle body frame 2 via rubber mounts 21.

As illustrated in FIG. 3, a turbo charger 22 that supercharges intake air with the exhaust gas is provided on the left side of the engine 15. The turbo charger 22 is provided so that an exhaust gas outlet faces to the rear. A pipe unit 23 is provided between the turbo charger 22 and the exhaust gas post-processing device 18. A flexible intake pipe 24 made of rubber or plastic is provided between the turbo charger 22 and the air cleaner 13. A difference in vibration between the engine 15 and the air cleaner 13 is absorbed by the intake pipe 24.

(Supporting Mechanism 17)

Figure 5:
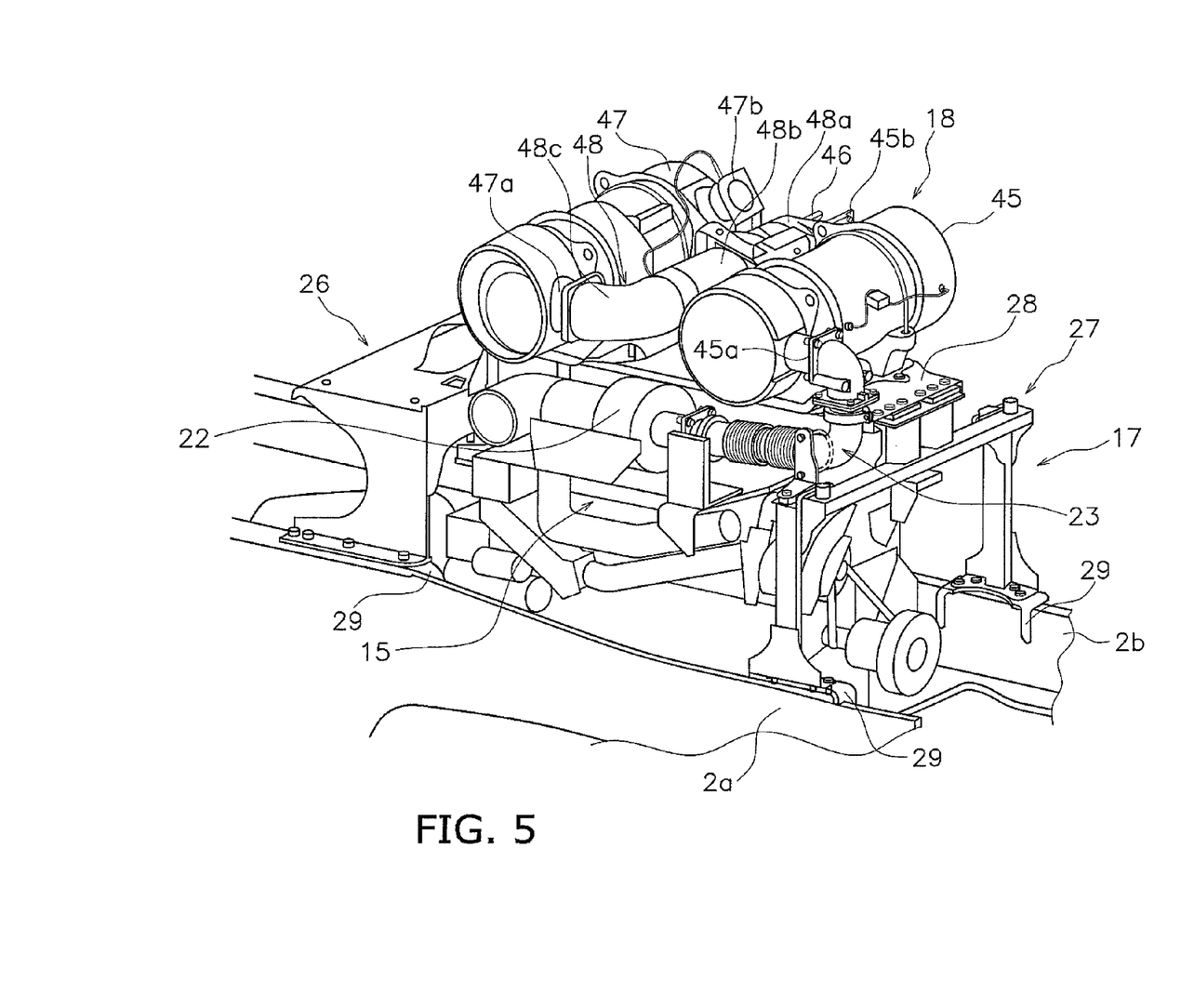
FIG. 5 is a perspective view illustrating an exhaust gas post-processing device and a supporting mechanism.
Figure 6:
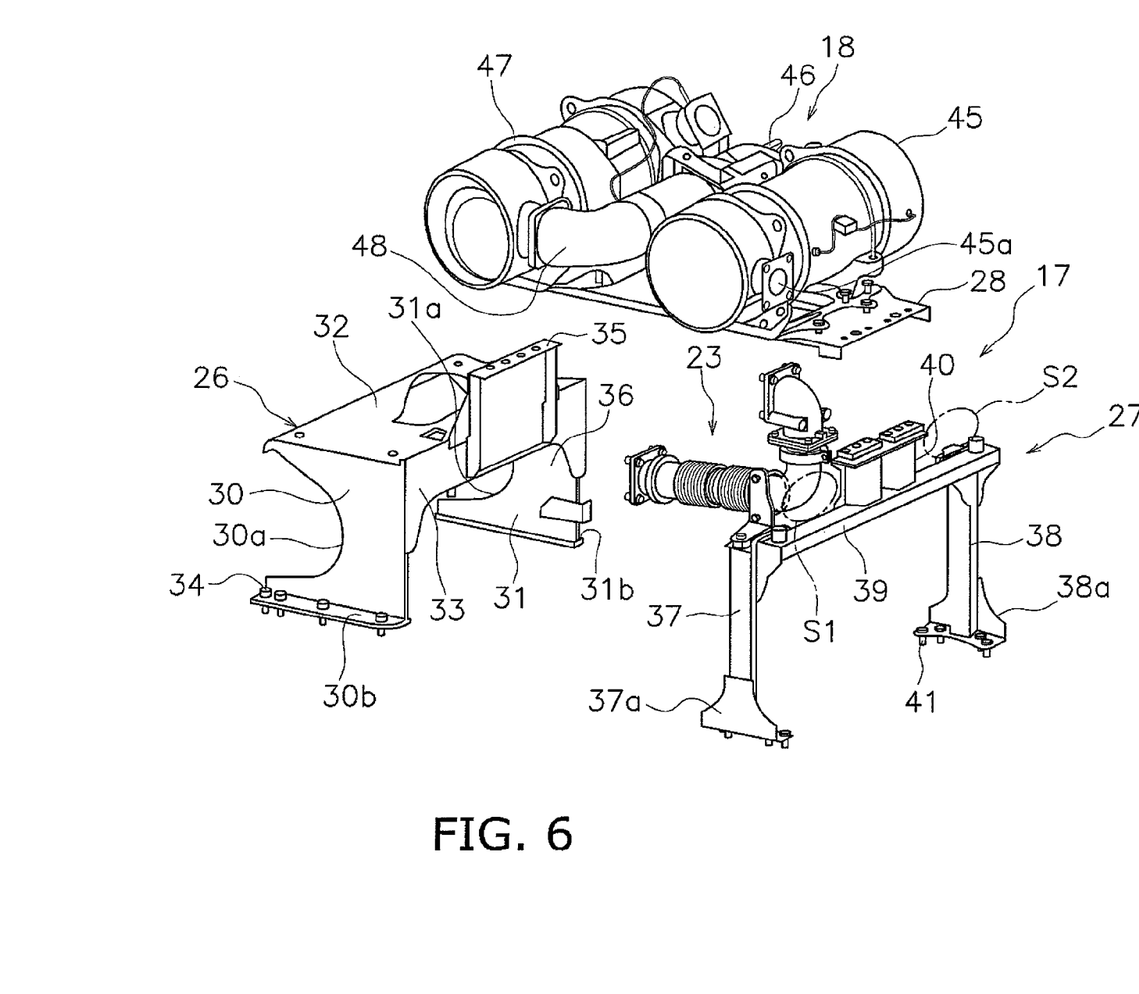
FIG. 6 is an exploded perspective view of the supporting mechanism.

FIG. 5 is a perspective view of a portion of FIG. 3 as seen from the rear. FIG. 6 is a perspective view illustrating the supporting mechanism 17 in a disassembled state. As illustrated in FIGS. 5 and 6, the supporting mechanism 17 is fixed directly to the vehicle body frame 2 with bolts and is configured by a front supporting frame 26, a rear supporting frame 27, and a base plate 28. More specifically as illustrated in FIG. 5, side frames 2a, 2b that extend in the front-back direction are provided respectively on the left and right sides of the rear body portion. Brackets 29 are provided in the front and back of the left and right side frames 2a, 2b and the front supporting frame 26 and the rear supporting frame 27 are fixed to the brackets 29.

The front supporting frame 26 includes left and right side portions 30, 31, a top plate portion 32, and a connecting portion 33. Front portions of the left and right side portions 30, 31 are formed in rectangle shape and respectively have substantially semi-circular notched portions 30a, 31a. Plates of the left and right side portions 30, 31 have attachment portions 30b, 31b formed at the lower ends thereof to extend to the outside. The attachment portions 30b, 31b are fixed with a plurality of bolts 34 to the brackets 29 provided on the inside of the left and right side frames 2a, 2b. The top plate portion 32 is provided to connect the upper portions of the left and right side portions 30, 31. The operating fluid tank 19 is mounted on the upper surface of the top plate portion 32. That is, the front supporting frame 26 also acts as a base to support the operating fluid tank 19. The connecting portion 33 connects the rear portions of the left and right side portions 30, 31. The center portion in the crosswise direction of the connecting portion 33 projects further upward than the upper surface of the top plate portion 32 to form a front supporting portion 35. The width in the crosswise direction of the front supporting portion 35 is formed to be narrower than the width in the crosswise direction of the top plate portion 32.

The rear supporting frame 27 includes left and right posts 37, 38, a top beam 39, and a rear supporting portion 40. The left and right posts 37, 38 respectively include attachment portions 37a, 38a at the lower ends thereof. The attachment portions 37a, 38a are substantially triangular as seen from the side and the lower ends thereof are formed to extend toward the inside. The portions extending toward the inside are fixed with a plurality of bolts 41 to the brackets 29 provided on the inside of the left and right side frames 2a, 2b. The top beam 39 connects the upper portions of the left and right posts 37, 38, and the rear supporting portion 40 is provided in the center portion in the crosswise direction of the top beam 39. The rear supporting portion 40 projects further upward than the top beam 39 and is formed to be at the same height as the front supporting portion 35 of the front supporting frame 26.

Since the rear supporting portion 40 projects upward further than the top beam 39 and the width in the crosswise direction is shorter than the top beam 39 in the rear supporting frame 27 as described above, spaces S1, S2 for disposing members are formed in the crosswise direction of the rear supporting portion 40. In the present embodiment, a portion of the pipe unit 23 and pipes 42a, 42b connected to a cooling unit 16 are disposed so as to use the spaces S1, S2 as illustrated in FIG. 3.

The base plate 28 is provided between the front supporting portion 35 of the front supporting frame 26 and the rear supporting portion 40 of the rear supporting frame 27. The base plate 28 is formed to have a rectangular shape and the width in the crosswise direction is substantially the same as the widths of the front supporting portion 35 and the rear supporting portion 40.

Figure 7:
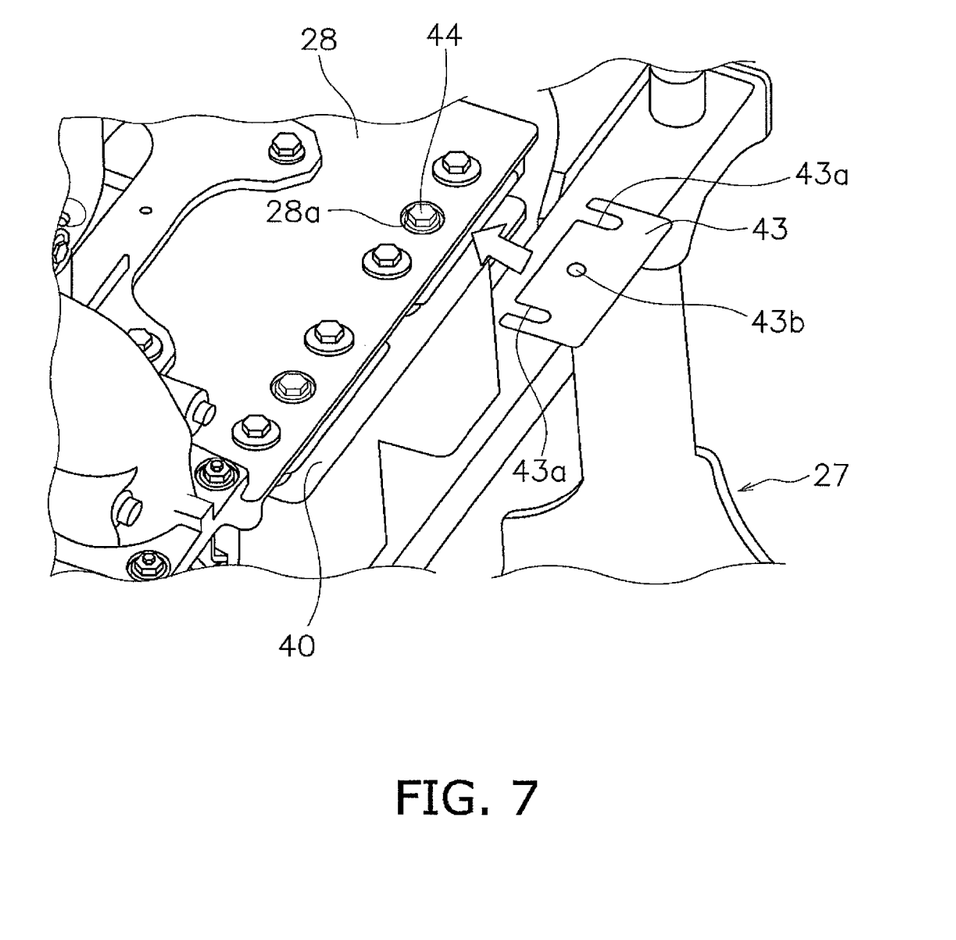
FIG. 7 illustrates a shim attached to the supporting mechanism.

As illustrated in FIG. 7, a shim 43 can be mounted in two locations in the crosswise direction between the bottom surface of the base plate 28 and the top surface of the rear supporting portion 40 of the rear supporting frame 27 (only one is illustrated in FIG. 7). The shim 43 is used for adjusting the height of the exhaust gas post-processing device 18 and the pipe unit 23 when the base plate 28 upon which is mounted the exhaust gas post-processing device 18 is fixed to the rear supporting portion 40 of the rear supporting frame 27. The shim 43 is rectangular and has a pair of notches 43a that open to one side at both ends in the crosswise direction, and a through hole 43b located between the pair of notches 43a.

The shim 43 is fixed to the top surface of the rear supporting portion 40 by a bolt 44. A large hole 28a with a diameter greater than the head of the bolt 44 is formed in the base plate 28 in the location where the bolt 44 is provided. Obstruction between the base plate 28 and the bolt 44 can be avoided as a result of the hole 28a. Therefore, the base plate 28 can be attached or detached with the shim 43 fixed to the rear supporting portion 40.

The shim 43 can be prepared in various thicknesses or one or a plurality of shims 43 can be used in combination to allow the height to be adjusted.

(Exhaust Gas Post-Processing Device 18)

As illustrated in FIGS. 5 and 6, the exhaust gas post-processing device 18 is equipped with a diesel particulate filtering device 45, a connecting pipe 48, and a nitrogen oxide reduction catalyst device 47 in order from the exhaust gas upstream side of the engine 15 (hereinafter referred to simply as "upstream side"). An urea aqueous solution mixing device 46 is attached to the connecting pipe 48.

The diesel particulate filtering device 45 collects particulate matter such as soot and the like in the exhaust gas, and is mounted on the rear portion of the base plate 28 of the supporting mechanism 17. The urea aqueous solution mixing device 46 emits an urea aqueous solution sucked up by a pump that is not illustrated from an urea aqueous solution tank that is not illustrated, and adds the urea aqueous solution to the exhaust gas as a reducing agent. The added urea aqueous solution is hydrolyzed to become ammonia, and the ammonia is fed with the exhaust gas through the connecting pipe 48 to the nitrogen oxide reduction catalyst device 47. The ammonia from the urea aqueous solution mixing device 46 is used as the reducing agent to purify by reduction the nitrogen oxides in the exhaust gas in the nitrogen oxide reduction catalyst device 47. The nitrogen oxide reduction catalyst device 47 is mounted on the front portion of the base plate 28 of the supporting mechanism 17 in the same way as the diesel particulate filtering device 45. The diesel particulate filtering device 45 and the nitrogen oxide reduction catalyst device 47 are fixed to the base plate 28 via each of the separate attachment plates.

The diesel particulate filtering device 45 and the nitrogen oxide reduction catalyst device 47 are disposed parallel to each other. Specifically, the diesel particulate filtering device 45 and the nitrogen oxide reduction catalyst device 47 are both cylindrical and longitudinal center axes CA1 and CA2, respectively, thereof are disposed so as to extend in the crosswise direction of the wheel loader 1 and be parallel to each other. An exhaust gas inlet 45a is provided on the left edge portion of the diesel particulate filtering device 45, and an opening of the exhaust gas inlet 45a faces toward the rear. An exhaust gas outlet 45b is provided on the right edge portion of the diesel particulate filtering device 45, and an opening of the exhaust gas outlet 45b faces toward the front. An exhaust gas inlet 47a is provided on the left edge portion of the nitrogen oxide reduction catalyst device 47, and an opening of the exhaust gas inlet 47a faces toward the rear. An exhaust gas outlet 47b is provided on the right edge portion of the nitrogen oxide reduction catalyst device 47, and an opening of the exhaust gas outlet 47b faces toward the rear and obliquely upward. The connecting pipe 48 is disposed between the exhaust gas outlet 45b of the diesel particulate filtering device 45 and the exhaust gas inlet 47a of the nitrogen oxide reduction catalyst device 47.

Figure 10:
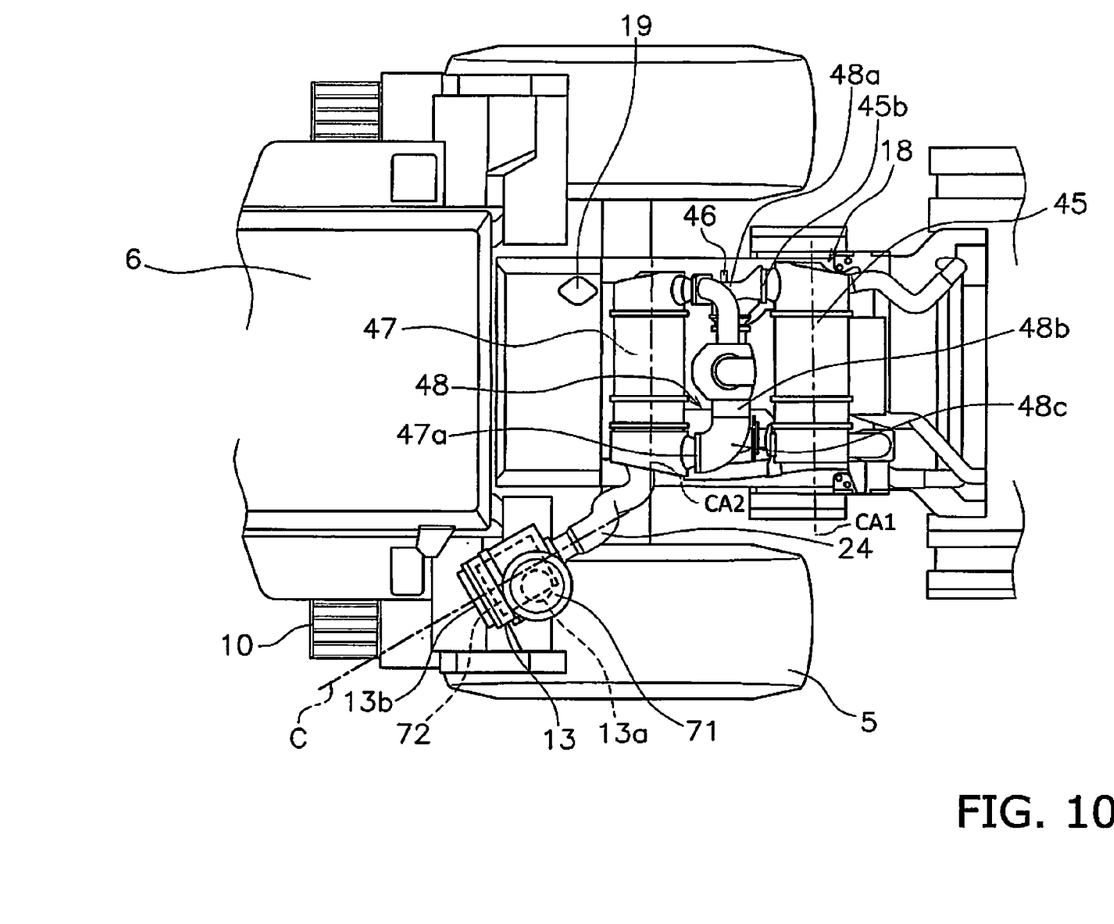
FIG. 10 is a plan view of a disposition of the air cleaner.

As illustrated in FIGS. 5 and 10, the connecting pipe 48 has a first bend section 48a, a linear section 48b, and a second bend section 48c, and the entire connecting pipe 48 forms an S shape. The first bend section 48a is located near the exhaust gas outlet 45b of the diesel particulate filtering device 45, and the second bend section 48c is located near the exhaust gas inlet 47a of the nitrogen oxide reduction catalyst device 47. The linear section 48b is located between the first bend section 48a and the second bend section 48c and is disposed parallel to the diesel particulate filtering device 45 and the nitrogen oxide reduction catalyst device 47.

The urea aqueous solution mixing device 46 is provided on the first bend section 48a and emits an urea aqueous solution into the connecting pipe 48. The emitted urea aqueous solution becomes evenly mixed with the exhaust gas while passing through the long linear section 48b.

The lengths in the crosswise direction of the diesel particulate filtering device 45 and the nitrogen oxide reduction catalyst device 47 are formed to be longer than the width in the crosswise direction of the base plate 28.

(Pipe Unit 23)

Figure 8:
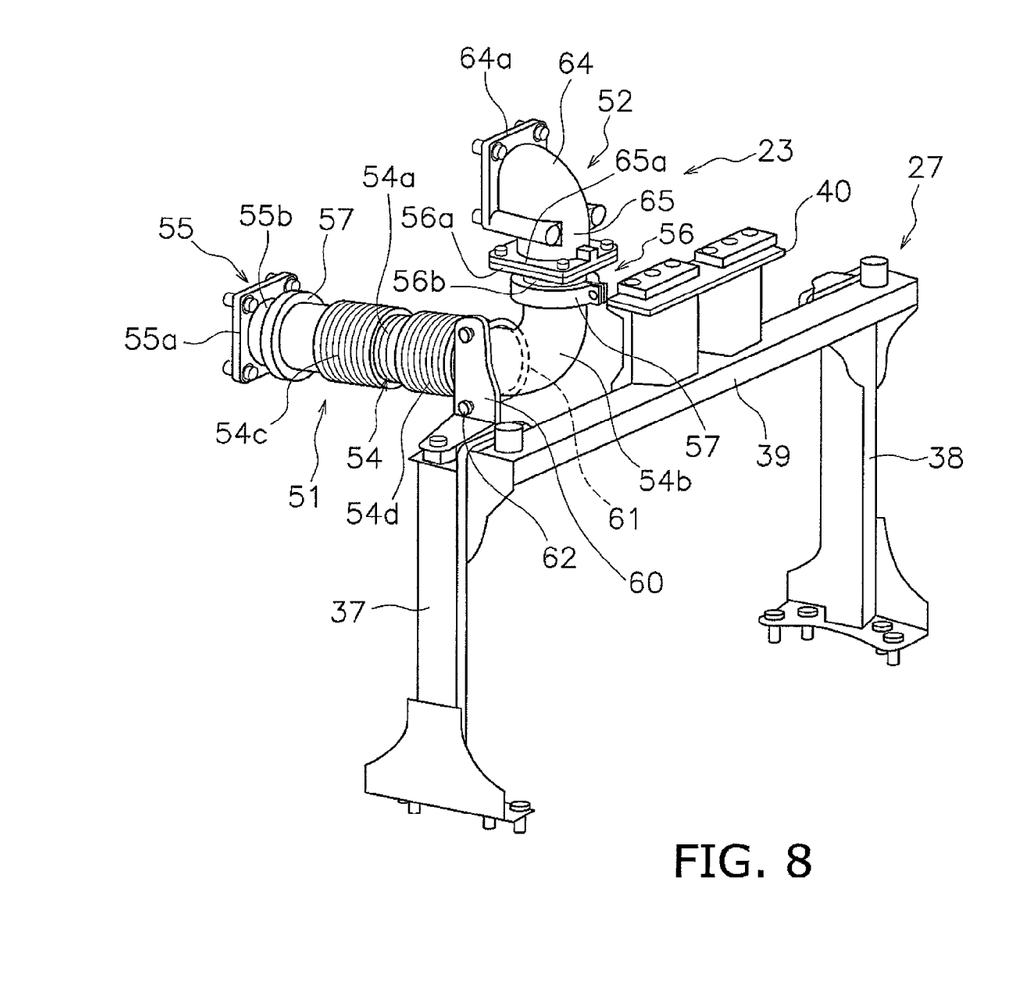
FIG. 8 is an external perspective view of a pipe unit.

FIG. 8 illustrates an enlargement of the pipe unit 23. The pipe unit 23 has an upstream side pipe 51 and a downstream side pipe 52.

The upstream side pipe 51 includes a pipe body 54, and a front flange 55 and a rear flange 56 respectively provided at either end of the pipe body 54. Spherical joints 57 are provided between the pipe body 54 and the front and rear flanges 55, 56.

The pipe body 54 is made of stainless steel and includes a linear extending section 54a that extends from the front toward the rear, and a bend section 54b that bends upward from the rear end portion of the extension 54a. Two bellows-like flexible pipe sections 54c, 54d are formed in the extending section 54a. The front and rear flanges 55, 56 respectively include rectangular connecting end faces 55a, 56a and pipe sections 55b, 56b that respectively extend from the connecting ends 55a, 56a. The connecting end face 55a of the front flange 55 is connected to an exhaust gas outlet of the turbo charger 22. The connecting end face 56a of the rear flange 56 is connected to the downstream side pipe 52.

A spherical joint that uses the known technology disclosed in U.S. Patent No. 2011/007415 may be used for example as the spherical joint 57.

As illustrated in FIG. 8, the upstream side pipe 51 is fixed to the left post 37 of the rear supporting frame 27 via a fixing plate 60 and a U-shaped metal fitting 61. The fixing plate 60 is L-shaped and a lower side thereof is fixed to the upper portion of the left post 37. Both ends of the U-shaped metal fitting 61 that holds the rear portion (exhaust gas downstream side) of the flexible pipe section 54d of the pipe body 54 are fixed to the standing side of the fixing plate 60 with nuts 62.

The downstream side pipe 52 is a 90-degree elbow and includes a first pipe section 64 that is connected to the diesel particulate filtering device 45, and a second pipe section 65 that is orthogonal to the first pipe section 64. The second pipe section 65 is configured by the bend section 54b of the upstream side pipe 51 and a linking section that links the lower and upper sections of the connecting pipe 23.

A flange 64a is formed at the exhaust gas downstream side end of the first pipe section 64 and is connected to the exhaust gas inlet 45a of the diesel particulate filtering device 45. A flange 65a is formed at the exhaust gas upstream side end of the second pipe section 65 and is connected to the connecting end face 56a of the rear flange 56 of the upstream side pipe 51.

Figure 9:
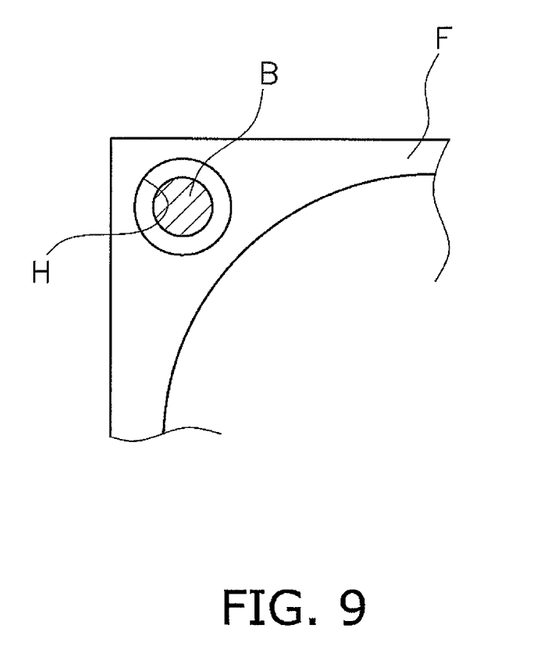
FIG. 9 is a schematic view for explaining an adjustment function of a flange connecting portion.

As schematically illustrated in FIG. 9, in the connection of a flange F (collective name for flanges), one or two bolt through holes H in the flange F is formed to have a larger diameter than the diameter of a coupling bolt B. As a result, when mounting the exhaust gas post-processing device 18 on the base plate 28 to make a sub-unit and when assembling the sub-unit with the pipe unit 23 fixed to the rear supporting frame 27, an assembly error can be absorbed even if an error exists in the positional relationship between the exhaust gas post-processing device 18 and the pipe unit 23. That is, the assembly structure of the flanges F functions as an adjusting mechanism for adjusting the assembly location.

(Air Cleaner 13)

The air cleaner 13 and a disposition thereof are explained with reference to FIGS. 2 and 11. The air cleaner 13 is provided outside of the engine room and on the upper portion of the rear wheel fender 5a. The rear wheel fender 5a is configured of a fender front portion 5b and a fender rear portion 5c fastened to the fender front portion 5b. The fender front portion 5b is configured by a horizontal portion and a sloped portion that slopes forward and downward from the horizontal portion. The fender rear portion 5c is formed in an arced shape as seen from the side and covers the upper portion and the upper rear portion of the rear wheel 5. The air cleaner 13 is mounted on the horizontal portion of the fender front portion 5b.

As illustrated in FIG. 2, except for a portion thereof, the air cleaner 13 is covered by an air cleaner cover 70 that is provided on the outside of the vehicle body cover 9. FIG. 11 is a plan view of the air cleaner 13 and portions related to the air cleaner 13 with the vehicle body cover 9 and the air cleaner cover 70 removed.

Figure 11:
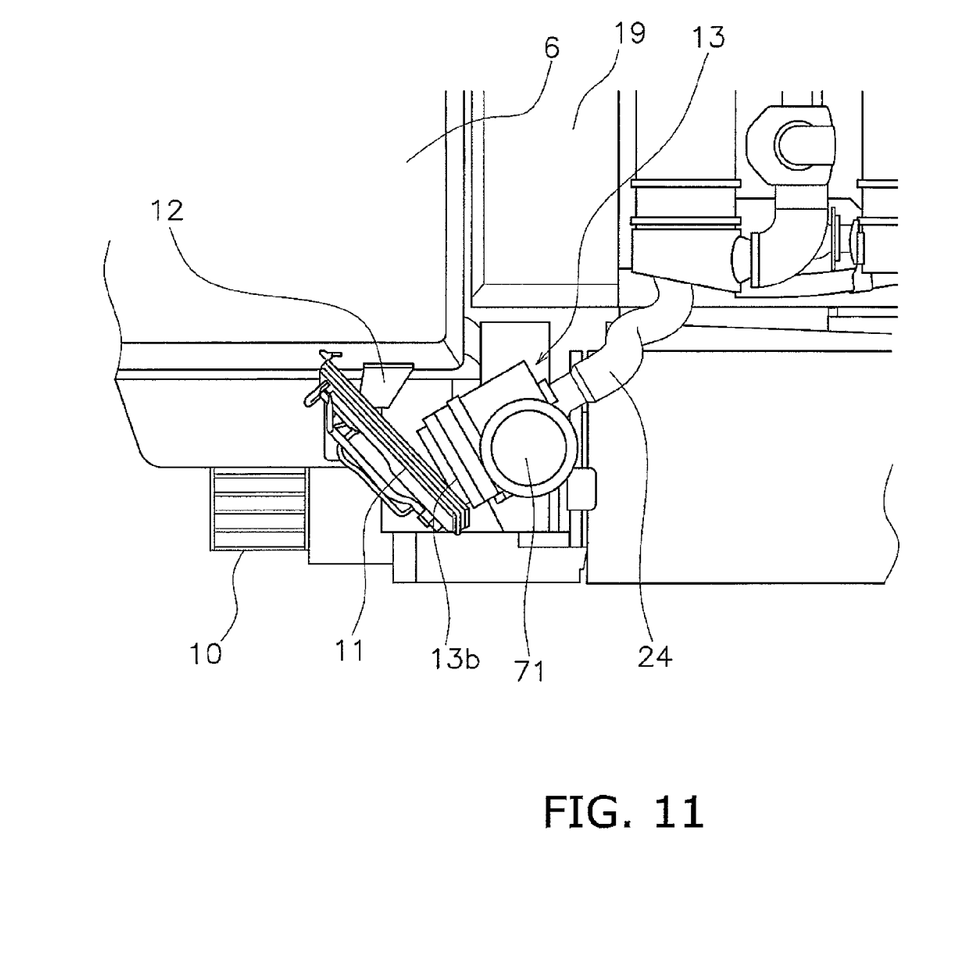
FIG. 11 illustrates a relationship between the air cleaner and the door.

As illustrated in FIGS. 2 and 11, the air cleaner 13 is cylindrical and a cap 71 that covers an air intake mouth 13a is provided on the upper portion of the air cleaner 13, and an openable and closable lid 13b is provided on the front portion of the air cleaner 13. A filter 72 is provided in an attachable and detachable manner inside the air cleaner 13. The air cleaner cover 70 covers most of the air cleaner 13 excluding the front end portion to which the air intake mouth 13a, the cap 71, and the lid 13b are attached. The filter 72 can be maintained and exchanged by opening the lid 13b and pulling the filter 72 out obliquely toward the front.

The disposition of the air cleaner 13 is explained in detail below.

As illustrated in FIG. 11, the air cleaner 13 is disposed on the upper portion of the fender front portion 5b of the rear wheel fender 5a and the lateral side of the rear of the cab 6. More specifically, the front portion of the air cleaner 13 is located to the rear of the steps 10 and beside the rear end portion of the cab 6, and the rear portion of the air cleaner 13 is located beside the front portion of the operating fluid tank 19. A center axis C of the air cleaner 13 is substantially horizontal and is slanted with respect to a center axis extending to the front and rear of the vehicle so that the front portion of the air cleaner 13 is further away from the cab 6 than the rear portion. As described above, the filter 72 can be pulled out toward the front along the center axis C.

Figure 12:
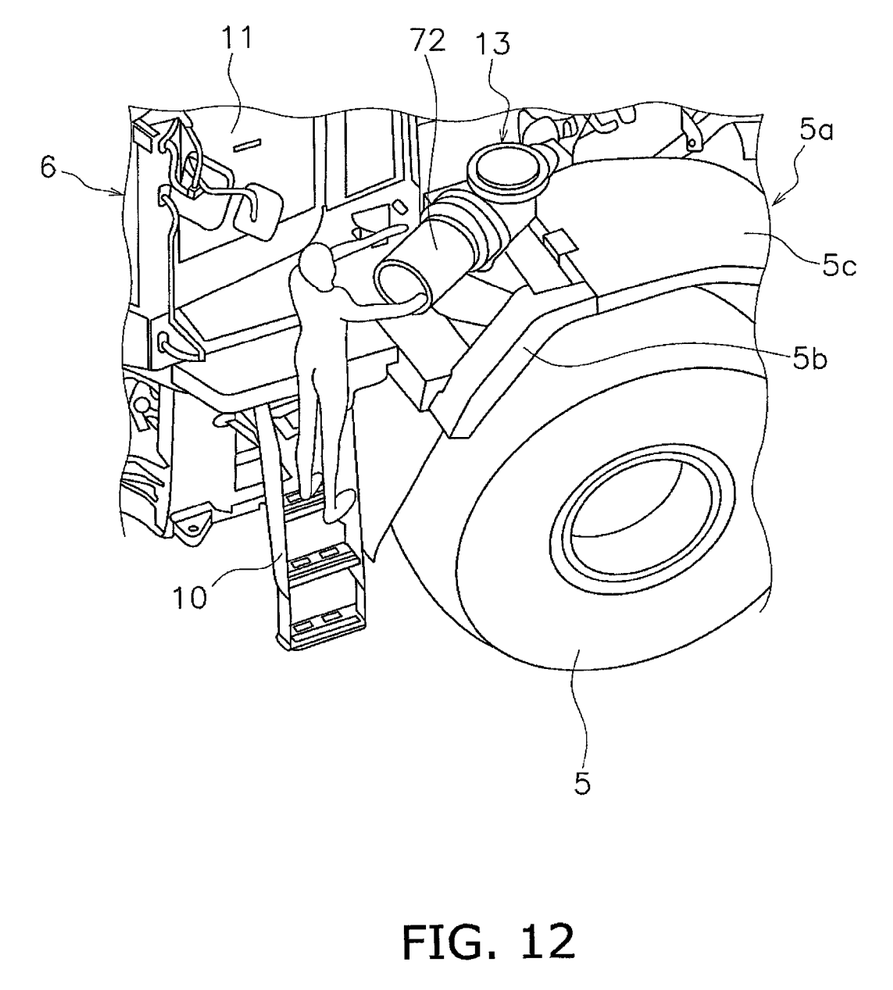
FIG. 12 illustrates an appearance of maintenance work on the air cleaner.

As described above, the stopper 12 is provided on the cab 6 to limit the maximum opening degree of the door 11, and as illustrated in FIG. 12, the front end portion of the air cleaner 13 is disposed in a location that does not obstruct the door 11 even if the door 11 is opened to the maximum to abut the stopper 12.

Due to the disposition of the air cleaner 13 as described above, the operator can stand on the steps 10 and open the lid 13b of the air cleaner 13 to easily perform maintenance or exchange the filter 72 as illustrated in FIG. 12.

(Flow of Air and Exhaust Gas)

As illustrated in FIG. 3, air is introduced from the air cleaner 13 and fed into the engine 15 through the intake pipe 24 and the turbo charger 22. Exhaust gas from the engine 15 is introduced through the pipe unit 23 into the exhaust gas post-processing device 18 after driving the turbo charger 22.

Particulate matter such as soot is collected by the diesel particulate filtering device 45 in the exhaust gas post-processing device 18. Next, the particulate matter is introduced into the urea aqueous solution mixing device 46. An urea aqueous solution is emitted into the exhaust gas to mix with the exhaust gas in the urea aqueous solution mixing device 46. Consequently, the urea aqueous solution is hydrolyzed by the heat of the exhaust gas and water vapor in the exhaust gas to become ammonia. The ammonia generated in this way is fed with the exhaust gas through the connecting pipe 48 to the nitrogen oxide reduction catalyst device 47. The ammonia is used as the reducing agent to purify by reduction the nitrogen oxides in the exhaust gas in the nitrogen oxide reduction catalyst device 47.

(Attachment and Detachment of Exhaust Gas Post-Processing Device 18)

The diesel particulate filtering device 45 is desirably removed from the vehicle at certain time periods for maintenance. Accordingly, the exhaust gas post-processing device 18 is made into a sub-unit with the base plate 28 to facilitate assembly and maintenance of the exhaust gas post-processing device 18. When assembling the sub-unit onto the supporting mechanism 17, the pipe unit 23 is fixed to the engine 15 and the supporting mechanism 17.

Specifically, the front flange 55 of the upstream side pipe 51 is connected to the exhaust gas outlet of the turbo charger 22, and the downstream side of the flexible pipe 54d of the pipe body 54 is fixed to the supporting mechanism 17 with the fixing plate 60 and the U-shaped metal fitting 61. When coupling the upstream side pipe 51 to the turbo charger 22, the upstream side pipe 51 and the spherical joint 57 on the exhaust gas upstream side are connected temporarily. The U-shaped metal fitting 61 is also fastened temporarily.

Next, the downstream side pipe 52 is connected to the upstream side pipe 51. The upstream side pipe 51 and the downstream side pipe 52 may be connected to each other before coupling the upstream side pipe 51 to the turbo charger 22. As described above, in this case the flanges 56 and 65a are connected to each other with the exhaust gas downstream side spherical joint 57 in a temporarily fastened state.

As described above, the sub-unit is supported by the supporting mechanism 17 in a state in which the pipe unit 23 is fixed to the engine 15 and the supporting mechanism 17 side. When assembling the sub-unit on the supporting mechanism 17, both the heights thereof are adjusted by the shim 43 and adjustment in the front-rear, vertical, and crosswise directions are performed by adjusting the assembly of the flanges 64a, 65a at both ends of the downstream side pipe 52. Further, angle adjustment of the sub-unit and the supporting mechanism 17 is performed with the spherical joints 57 at either end of the upstream side pipe 51. The shim adjustments are rarely performed during maintenance since the adjustments are performed by the manufacturer before shipping.

Since the relatively long flexible pipe sections 54c, 54d are provided in the upstream side pipe 51 of the pipe unit 23, an assembly error can be absorbed by the flexible pipe sections 54c, 54d when performing the above adjustment.

As described above, when the locations of the sub-unit is adjusted appropriately with the engine 15 and the supporting mechanism 17, the temporarily fastened portions are firmly fixed and the assembly work is completed.

In the state in which the exhaust gas post-processing device 18 is assembled, the engine 15 and the transmission 20 are mounted on the vehicle body frame 2 via the rubber mounts 21, and the exhaust gas post-processing device 18 is mounted directly onto the vehicle body frame 2 via the supporting mechanism 17. As a result, a difference arises between vibrations from the engine 15 and vibrations from the exhaust gas post-processing device 18 while the vehicle is operating.

However, the difference between the two vibrations can be sufficiently absorbed since the relatively long flexible pipe sections 54c, 54d are formed in the extending section 54a of the pipe unit 23. Therefore, the vibration of the engine 15 can be suppressed.

(Air Cleaner 13 Maintenance)

Exchanging and cleaning of the filter 72 are desirably performed at certain time periods in the air cleaner 13. At this time the filter 72 is desirably removed from the air cleaner 13.

When removing the filter 72 from the air cleaner 13, the operator stands on the steps 10 and opens the lid 13b of the air cleaner 13 as illustrated in FIG. 13. The filter 72 of the air cleaner 13 may be pulled out toward the front along the center axis C of the air cleaner 13. At this time, since the air cleaner 13 is slanted so that the front side thereof is further away from the cab 6 than the rear side thereof, the work to remove the filter 72 is easy to perform.

(Characteristics)

Since the air cleaner 13 is disposed outside of the engine room and beside the rear of the cab 6, the upper plate of the engine room does not become higher and the diesel particulate filtering device 45 and the nitrogen oxide reduction catalyst device 47 can be disposed above the engine 15. Therefore, a reduction in visibility to the rear can be avoided even if the nitrogen oxide reduction catalyst device 47 is added to the exhaust gas post-processing device 18.

(2) The air cleaner 13 is disposed to the rear of the steps 10 and slanted so that the front side of the air cleaner 13 from which the filter 72 is pulled out is further away from the cab 6 than the rear side. Therefore, the operator can easily pull out the filter 72 while standing on the steps 10 and maintenance work can be conducted more easily.

(3) The air cleaner 13 is disposed at a location that does not obstruct the door 11 of the cab 6 when the door 11 is fully open. Therefore, the driver is able to enter and exit the operating cabin of the cab 6 without worrying about the opening or closing degree of the door 11.

(4) The exhaust gas post-processing device 18 is mounted on the supporting mechanism 17 that is provided independently of the engine 15. Therefore, engine vibration can be suppressed more in comparison to when the diesel particulate filtering device is mounted on the engine as with the conventional device.

(Other Embodiments)

The present invention is not limited to the above embodiments and various changes and modifications may be made without departing from the spirit of the invention.

While the air cleaner 13 is fixed to the rear wheel fender 5*a* in the previous embodiment, the air cleaner may be fixed to another member so long as the air cleaner is located beside the rear of the cab 6.

(b) While a case in which the rear wheel fender 5*a* is divided into two portions and the air cleaner 13 is fixed to the fender front portion 5*b* is described in the previous embodiment, the air cleaner 13 may be fixed to the upper portion of an integrated rear wheel fender.

(c) While a case in which the steps 10 and the air cleaner 13 are provided on the left side of the cab 6 is described in the previous embodiment, the steps 10 and the air cleaner 13 may be provided on the right side of the cab 6.

Field of Use

A reduction in visibility to the rear is prevented and maintenance work on the air cleaner can be performed more easily in the wheel loader of the present invention since the air cleaner is disposed toward the rear portion of the cab and is disposed in a slanted manner so that the front from where the filter is pulled out is further away from the cab.

What is claimed is:

1. A wheel loader comprising:
   a cab with a driver's seat provided therein;
   steps provided beside the cab to ascend to and descend from the cab;
   an engine disposed to rearward of the cab in a front-back direction of the wheel loader;
   a vehicle body cover covering the engine; and
   an air cleaner having a filter therein, the filter being exchangeable by being pulled out from and inserted into a front end portion of the air cleaner along a horizontal direction when the wheel loader is disposed on a level surface, and the air cleaner being connected to the engine via an intake pipe,
   the air cleaner being disposed outside the vehicle body cover and arranged such that at least a portion of the air cleaner is positioned rearward of the cab and at least a portion of the air cleaner is positioned farther outward in a lateral direction of the wheel loader than the cab, the air cleaner being arranged to extend in a diagonal orientation in a top plan view of the wheel loader such that the front end portion of the air cleaner is disposed farther outward in the lateral direction of the wheel loader than a rear end portion of the air cleaner.

2. The wheel loader according to claim 1, wherein the cab has a cab body and a door supported by a rear portion of the cab body so that a front side of the door is openable and closable; and
   the air cleaner is disposed at a location that does not obstruct the door when the door is fully open.

3. The wheel loader according to claim 1, further comprising:
   an operating fluid tank disposed between the cab and the engine, with the air cleaner being disposed beside the operating fluid tank.

4. The wheel loader according to claim 1, further comprising:
   a rear wheel fender disposed above a rear wheel, with the air cleaner being fixed to an upper portion of the rear wheel fender.

5. The wheel loader according to claim 1, further comprising:
   an exhaust gas post-processing device disposed above the engine and including a diesel particulate filtering device and a nitrogen oxide reduction catalyst device,
   the diesel particulate filtering device and the nitrogen oxide reduction catalyst device are both cylindrical and oriented such that longitudinal center axes thereof extend in a crosswise direction of the wheel loader, the longitudinal center axes being parallel to each other and spaced apart from each other in the front-back direction of the wheel loader.

6. The wheel loader according to claim 5, further comprising:
   a vehicle body frame supporting the engine; and
   a supporting mechanism fixed to the vehicle body frame, with the exhaust gas post-processing device being mounted upon the supporting mechanism.

7. The wheel loader according to claim 1, further comprising:
   an air cleaner cover covering the air cleaner except for the front end portion and an air intake mouth of the air cleaner.

8. The wheel loader according to claim 2, further comprising:
   an operating fluid tank disposed between the cab and the engine, with the air cleaner being disposed beside the operating fluid tank.

9. The wheel loader according to claim 2, further comprising:
   a rear wheel fender disposed above a rear wheel, with the air cleaner being fixed to an upper portion of the rear wheel fender.

10. The wheel loader according to claim 2, further comprising:
    an exhaust gas post-processing device disposed above the engine and including a diesel particulate filtering device and a nitrogen oxide reduction catalyst device,
    the diesel particulate filtering device and the nitrogen oxide reduction catalyst device are both cylindrical and oriented such that longitudinal center axes thereof to extend in a crosswise direction of the wheel loader, the longitudinal center axes being parallel to each other and spaced apart from each other in the front-back direction of the wheel loader.

11. The wheel loader according to claim 2, further comprising:
    an air cleaner cover covering the air cleaner except for the front end portion and an air intake mouth of the air cleaner.

12. The wheel loader according to claim 3, further comprising:
    a rear wheel fender disposed above a rear wheel, with the air cleaner being fixed to an upper portion of the rear wheel fender.

13. The wheel loader according to claim 4, further comprising:
    an operating fluid tank disposed between the cab and the engine, with the air cleaner being disposed beside the operating fluid tank.

* * * * *